(12) United States Patent
Tian et al.

(10) Patent No.: US 9,972,345 B1
(45) Date of Patent: May 15, 2018

(54) METHOD FOR MAKING A WRITE HEAD FOR MAGNETIC RECORDING (71) Applicant: Seagate Technology LLC, Cupertino, CA (US)

(72) Inventors: Wei Tian, Eden Prairie, MN (US); Hauqing Yin, Eden Prairie, MN (US); Lei Lu, Bloomington, MN (US); Yong Luo, Plymouth, MN (US); Joseph Mundenar, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 328 days.

(21) Appl. No.: 14/974,743

(22) Filed: Dec. 18, 2015

(51) Int. Cl.
*G11B 5/127* (2006.01)
*G11B 5/11* (2006.01)

(52) U.S. Cl.
CPC ............ *G11B 5/1272* (2013.01); *G11B 5/112* (2013.01); *G11B 5/1278* (2013.01)

(58) Field of Classification Search
CPC .. B44C 1/22; G11B 5/56; H01L 29/82; H01L 43/00; H01L 43/12
See application file for complete search history.

(56) References Cited

U.S. PATENT DOCUMENTS

| | | | |
|---|---|---|---|
| 8,230,583 B2 | 7/2012 | Lille | |
| 8,323,727 B2 | 12/2012 | Pentek et al. | |
| 8,347,488 B2 | 1/2013 | Hong et al. | |
| 8,381,392 B2 | 2/2013 | Zou et al. | |
| 8,468,682 B1 | 6/2013 | Zhang | |
| 8,470,186 B2 * | 6/2013 | Chen | G11B 5/1278 216/22 |
| 8,567,045 B2 | 10/2013 | Dovek et al. | |
| 8,570,686 B2 | 10/2013 | Hosomi et al. | |
| 8,625,233 B1 | 1/2014 | Ji et al. | |
| 8,634,162 B2 | 1/2014 | Bonhote et al. | |
| 8,893,376 B1 | 11/2014 | Shi et al. | |
| 8,914,969 B1 | 12/2014 | Zhou et al. | |
| 8,980,109 B1 | 3/2015 | Zhou et al. | |
| 8,988,073 B2 | 3/2015 | Fu et al. | |
| 9,082,423 B1 | 7/2015 | Liu et al. | |
| 9,135,930 B1 | 9/2015 | Zeng et al. | |

* cited by examiner

*Primary Examiner* — Carl Arbes
(74) *Attorney, Agent, or Firm* — Westman, Champlin & Koehler, P.A.

(57) ABSTRACT

A method includes depositing a layer of pole material on a substrate. The layer of pole material has a bottom surface that is adjacent to the substrate and a top surface that is opposite the bottom surface. A masking material is deposited over a portion of the top surface. Material from the pole material unprotected by the masking material is removed to form a write pole having first and second side walls. At least a portion of a trench formed by removal of the material from the layer of pole material is filled with a sacrificial material. The mask and a portion of the write pole at the top surface are removed to form a beveled trailing edge surface. The sacrificial material is then removed. Front shield gap material is deposited over the beveled trailing edge surface and over portions of the side walls.

20 Claims, 11 Drawing Sheets

METHOD FOR MAKING A WRITE HEAD FOR MAGNETIC RECORDING

BACKGROUND

Data storage devices use magnetic recording heads to read and/or write data on magnetic storage media, such as a data storage discs. Magnetic recording heads typically include inductive write elements to record data on the storage media. An inductive write element or transducer may include a main pole having a pole tip and one or more return poles. Current is supplied to write coils to induce a flux path in the main pole to record data on one or more magnetic storage layers of the media. Data can be recorded using longitudinal or perpendicular recording techniques. In a perpendicular magnetic recording system, it is desirable to maximize write field strength and also maximize write field gradient to record more data in smaller spaces. In addition, side track erasure (STE) and adjacent track interference (ATI) should be avoided. An increase in write field gradient is typically achieved by providing magnetic shielding adjacent to the write pole. The shield (referred to herein as a front shield or a trailing shield) is separated from the write pole by a non-magnetic gap, referred to herein as a front shield gap (FSG). A conventional magnetic recording head/transducer including a FSG is described below in connection with FIGS. 1A and 1B.

Figure 1A:
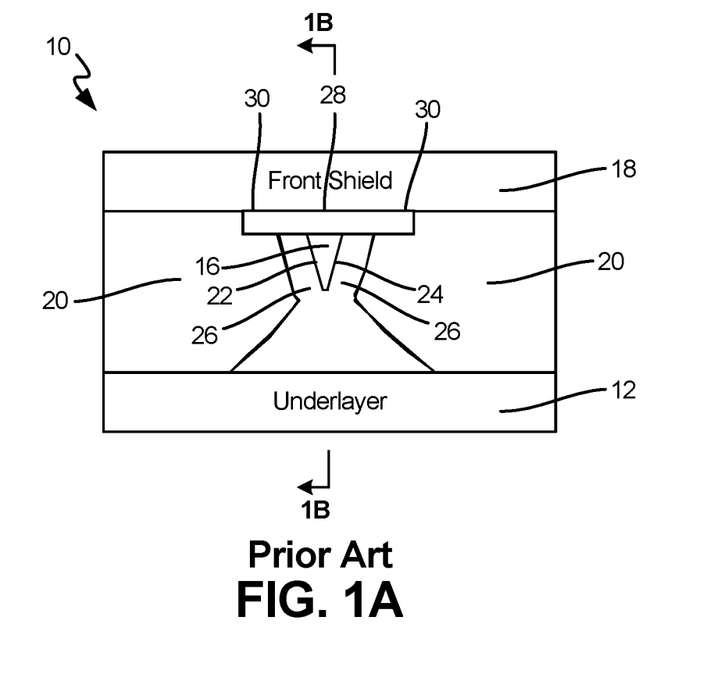
FIG. 1A is an air bearing surface view of a portion of a conventional magnetic recording head.
Figure 1B:
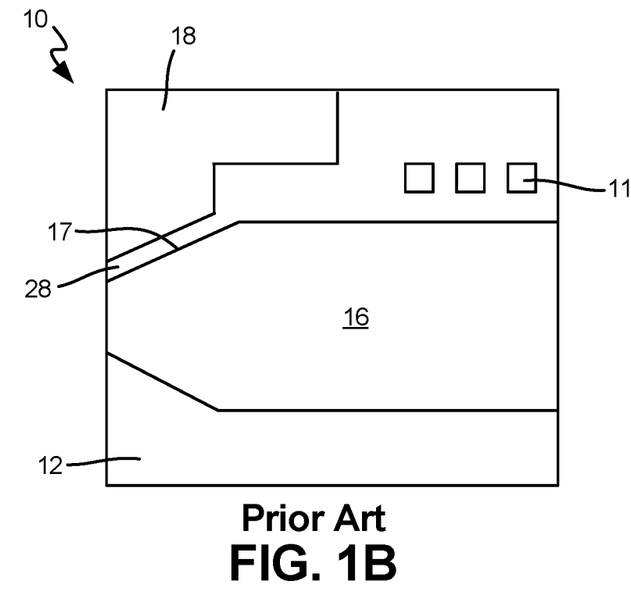
FIG. 1B is a side view of the recording head shown in FIG. 1A.

FIGS. 1A and 1B depict air bearing surface (ABS) and side views of a conventional perpendicular magnetic recording (PMR) transducer 10. The conventional PMR transducer 10 may be a part of a merged head including the write transducer 10 and a read transducer (not shown). Alternatively, the magnetic recording head may be a write head only including the write transducer 10.

The write transducer 10 includes an under-layer/substrate 12, a main pole 16, a front shield 18 and side shields 20. The under-layer 12 may include multiple structures which are under the pole 16. The write transducer 10 may also include other components including but not limited to coils (denoted by reference numeral 11 in FIG. 1B) for energizing the main pole 16.

The main pole 16 resides over under-layer 12 and includes sidewalls 22 and 24. Sidewalls 22 and 24 are separated from the side shields 20 by non-magnetic side shield gaps (SSGs) 26. The top (trailing) surface of the main pole 16 also has a beveled portion 17. A FSG 28 is formed between the front shield 18 and the main pole 16. In a conventional write head/transducer such as 10, the FSG 28 extends over or outside the SSGs 26 in a cross-track direction, forming overhangs 30 that separate the front shield 18 from portions of the side shields 20. The overhangs 30 may be produced by a write head fabrication process that employs photo patterning to define a shape and dimensions of FSG 28 as part of the steps for its formation. A recording head with such a FSG design may have certain on-track performance advantages, but may also produce STE and ATI which may be detrimental to a reliability of the recording head, particularly at high data-writing rates.

SUMMARY

The present disclosure relates to write head formation for perpendicular magnetic recording. In one method embodiment, a layer of pole material is deposited on a substrate. The layer of pole material has a bottom surface that is adjacent to the substrate and a top surface that is opposite the bottom surface. A masking material is deposited over a portion of the top surface. The method further includes removing material from the pole material unprotected by the masking material to form a write pole having first and second side walls between the portion of the top surface protected by the masking material and the substrate. At least a portion of at least one trench formed by removal of the material from the layer of pole material is filled with a sacrificial material. The mask and a portion of the write pole at the top surface are removed to form a beveled trailing edge surface of the write pole. The sacrificial material is removed after formation of the beveled trailing edge surface. Front shield gap material is deposited over the beveled trailing edge surface and over portions of the side walls.

Other features and benefits that characterize embodiments of the disclosure will be apparent upon reading the following detailed description and review of the associated drawings.

DETAILED DESCRIPTION OF ILLUSTRATIVE EMBODIMENTS

The present application relates to formation of write heads for perpendicular magnetic recording without front shield gap overhangs such as 30 shown in FIG. 1A. However, prior to providing additional details regarding the different embodiments, a description of an illustrative operating environment is provided below.

Figure 2A:
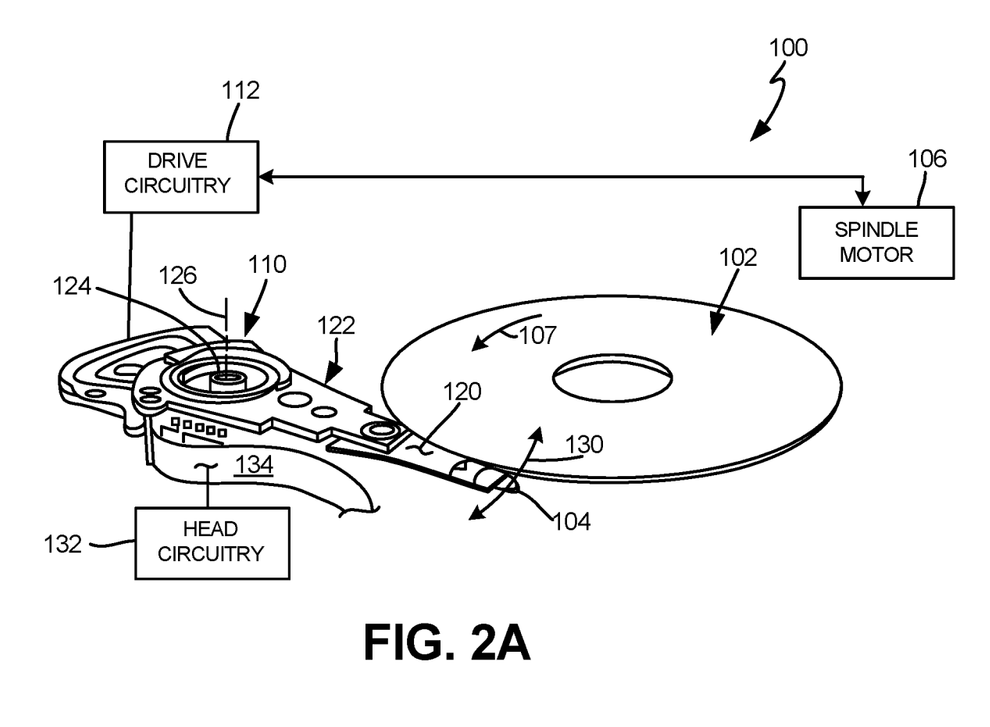
FIG. 2A illustrates an embodiment of a data storage device in which embodiments of the present application can be used.

FIG. 2A shows an illustrative operating environment in which certain write head embodiments formed as disclosed herein may be incorporated. The operating environment shown in FIG. 2A is for illustration purposes only. Embodiments of the present disclosure are not limited to any particular operating environment such as the operating environment shown in FIG. 2A. Embodiments of the present disclosure are illustratively practiced within any number of different types of operating environments. It should be noted that the same reference numerals are used in different figures for same or similar elements.

FIG. 2A is a schematic illustration of a data storage device 100 including a data storage medium and a head for reading data from and/or writing data to the data storage medium. As shown in FIG. 2A, the data storage device 100 includes a magnetic data storage medium or disc 102 and a head 104. The head 104 including one or more transducer elements (not shown in FIG. 2A) is positioned above the data storage medium 102 to read data from and/or write data to the data storage medium 102. In the embodiment shown, the data storage medium 102 is a rotatable disc or other magnetic storage medium that includes a magnetic storage layer or layers. For read and write operations, a spindle motor 106 (illustrated schematically) rotates the medium 102 as illustrated by arrow 107 and an actuator mechanism 110 positions the head 104 relative to data tracks on the rotating medium 102. Both the spindle motor 106 and actuator mechanism 110 are connected to and operated through drive circuitry 112 (schematically shown). The head 104 is coupled to the actuator mechanism 110 through a suspension assembly which includes a load beam 120 connected to an actuator arm 122 of the mechanism 110 for example through a swage connection.

The one or more transducer elements of the head 104 are coupled to head circuitry 132 through flex circuit 134 to encode and/or decode data. Although FIG. 2A illustrates a single load beam 120 coupled to the actuator mechanism 110, additional load beams 120 and heads 104 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 104 in a cross track direction as illustrated by arrow 130.

Figure 2B:
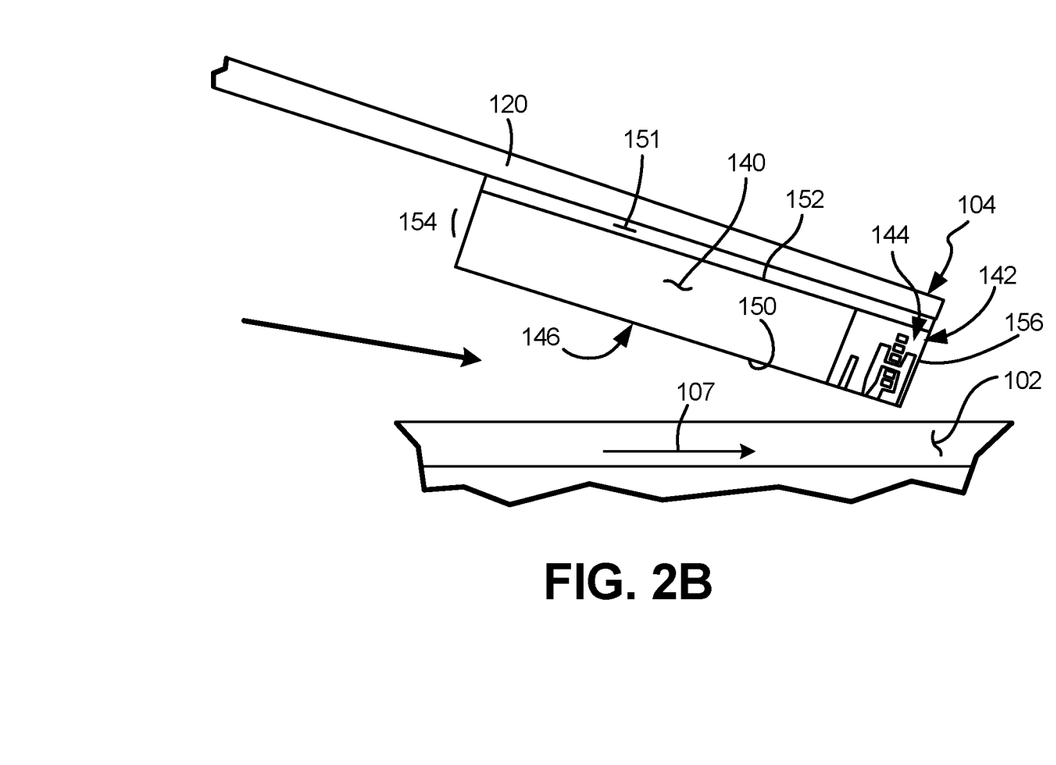
FIG. 2B is a schematic illustration of a head including one or more transducer elements above a magnetic recording medium.

FIG. 2B is a detailed illustration (side view) of the head 104 above the medium 102. The one or more transducer elements on the head 104 are fabricated on a slider 140 to form a transducer portion 142 of the head 104. The transducer portion 142 shown includes write elements encapsulated in an insulating structure to form a write assembly 144 of the head. As shown, the head 104 includes a bearing surface (for example, and air bearing surface (ABS)) 146 along a bottom surface 150 of the head or slider facing the medium 102. The head 104 is coupled to the load beam 120 through a gimbal spring 151 coupled to a top surface 152 of the head or slider 140 facing away from the medium 102. The medium 102 can be a continuous storage medium, a discrete track medium, a bit patterned medium or other magnetic storage medium including one or more magnetic recording layers.

During operation, rotation of the medium or disc 102 creates an air flow in direction 107 as shown in FIG. 2B along the air bearing surface 146 of the slider 140 from a leading edge 154 to the trailing edge 156 of the slider 140 or head 104. Air flow along the air bearing surface 146 creates a pressure profile to support the head 104 and slider 140 above the medium 102 for read and/or write operations. As shown, the transducer portion 142 is formed at or near the trailing edge 156 of the slider 140. A transducer/head portion in accordance with one embodiment is described below in connection with FIGS. 3A and 3B.

Figure 3A:
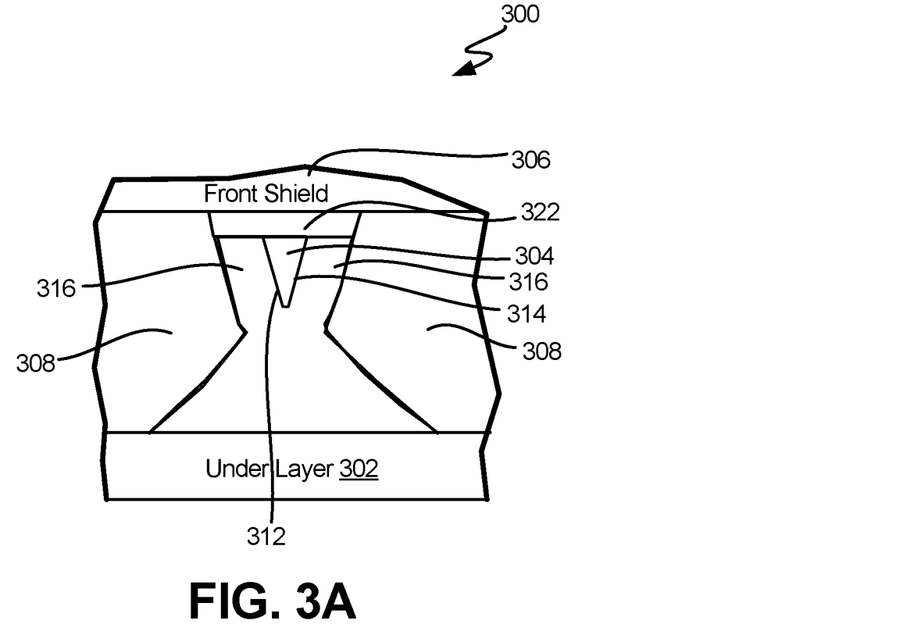
FIG. 3A depicts a bearing surface view of a perpendicular magnetic recording (PMR) transducer in accordance with one embodiment.
Figure 3B:
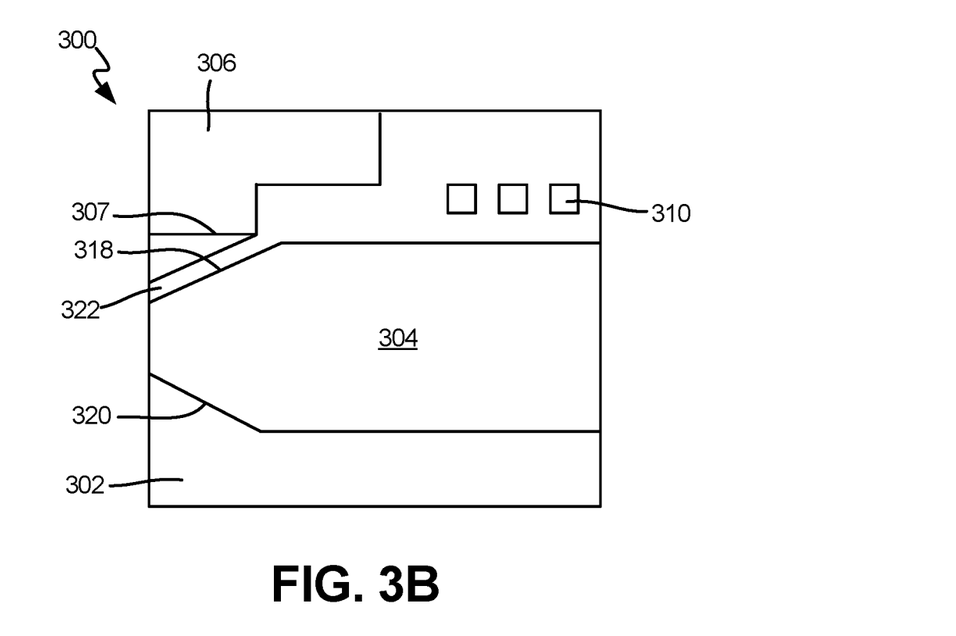
FIG. 3B depicts a side view of the PMR transducer of FIG. 3A.

FIGS. 3A and 3B depict air bearing surface and side views of a perpendicular magnetic recording (PMR) transducer 300, which may be formed by method embodiments described further below. The PMR transducer 300 may be a part of a merged head including the write transducer 300 and a read transducer (not shown). Alternatively, the magnetic recording head may be a write head only including the write transducer 300. The PMR transducer elements shown in FIGS. 3A and 3B are illustratively included in a recording head such as recording head 104 of FIGS. 2A and 2B.

The write transducer 300 includes an under-layer/substrate 302, a main pole 304, a front shield 306 and side shields 308. The under-layer 302 may include multiple structures which are under the pole 304. The write transducer 300 may also include other components including but not limited to coils (denoted by reference numeral 310 in FIG. 3B) for energizing the main pole 304.

The main pole 304 resides over under-layer 302 and includes sidewalls 312 and 314. Sidewalls 312 and 314 are separated from the side shields 308 by non-magnetic side shield gaps (SSGs) 316. The top (trailing) surface of the main pole 304 also has a beveled portion 318. The bottom (leading) surface of the main pole 304 may also include a leading surface bevel 320. A FSG 322 is formed between the main pole 304 and the front shield 306. However, unlike FSG 28 of the conventional write head/transducer shown in FIG. 1A that has overhangs 30 that separate the front shield 18 from portions of the side shields 20, FSG 322 has no overhangs that separate the front shield 306 from portions of the side shields 308. Thus, STE and ATI which may be detrimental to the reliability of the recording head, particularly at high data-writing rates, may be avoided or reduced by employing a writer such as 300. As will be described further below, side shields 308 and a portion of front shield 306 may be deposited or plated in one step and a remaining portion of the front shield 306 may be deposited or plated in another step. An interface 307 between the two separately deposited pieces is shown in FIG. 3B.

Figure 4A:
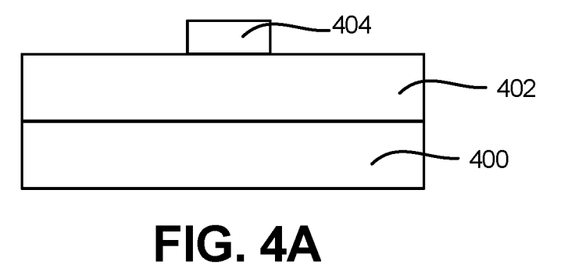
FIGS. 4A-4P, 5A and 5B illustrate embodiments of process steps for fabricating a PMR transducer of the type shown in FIGS. 3A and 3B.
Figure 4B:
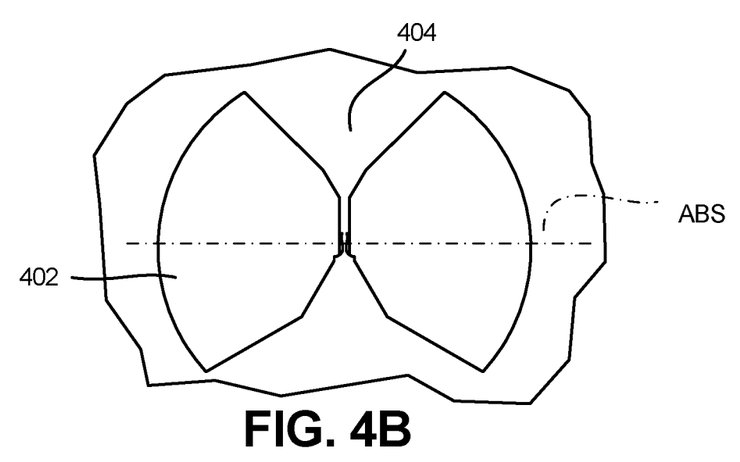

A method for manufacturing a magnetic write head/transducer such as 300 described above is described below in connection with FIGS. 4A-4P. Referring now to FIG. 4A, a substrate or under-layer 400 is provided. The substrate or under-layer 400 can be, for example, and insulation layer such as alumina ($Al_2O_3$) or can include multiple layers with at least one of the multiple layers being an insulation layer. Other structures or devices in a head may also be in or below the under-layer or substrate 400. A layer of magnetic pole material 402 is deposited over the substrate 400. The magnetic pole material 402 may include a single magnetic material or may be formed of several materials. In some embodiments, layer 402 may be a lamination of magnetic layers such as CoFe, NiFe, or their alloys separated by thin non-magnetic layers such as alumina, silicon dioxide or some other material. A mask structure 404 is formed over the magnetic layer 402. The mask structure can include one or more layers such as one or more hard mask layers, one or more image transfer layers, and/or a mask material such as photoresist or thermal image resist. As can be seen in FIG. 4B, the mask structure 404 defines a write pole structure that extends beyond a plane of a bearing surface (ABS in FIG. 4B).

Figure 4C:
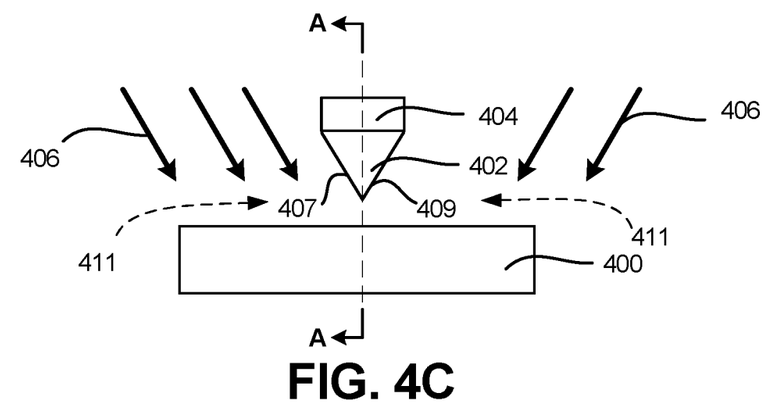
Figure 4D:
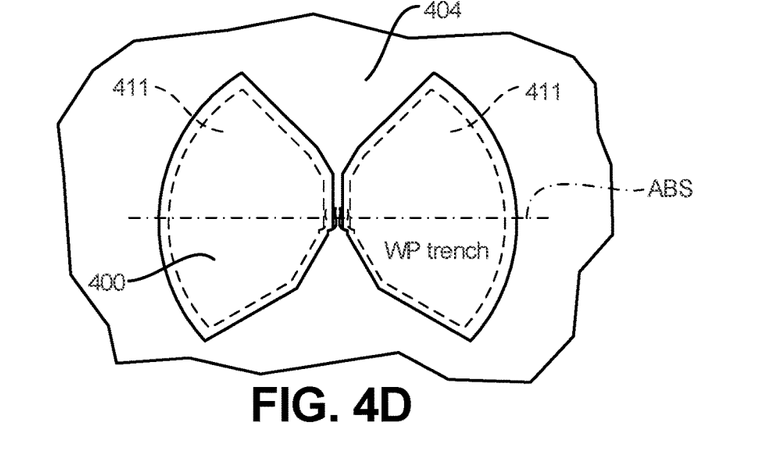

Referring now to FIG. 4C, a material removal process such as dry ion etching, or some other process is performed to remove portions of the magnetic pole material 402 that are not protected by the mask structure 404 to form a write pole structure 402. The material removal process, represented by slanted arrows 406 may be performed, for example, by directing an ion beam at an angle or combination of angles relative to normal. As a result of the ion beam being directed at an angle or at angles to the normal, some magnetic material 402 directly beneath the mask structure 404 may be removed to form the write pole 402 with a shape as shown in FIG. 4C. The write pole 402 in FIG. 4C includes tapered side walls 407 and 409. As can be seen in FIG. 4C, trenches 411 are formed on sides of the write pole 402 as a result of the removal of the portions of the magnetic pole material 402. Locations of trenches 411 are also shown in FIG. 4D, which is a top view of the structure whose ABS view is schematically shown in FIG. 4C.

Figure 4E:
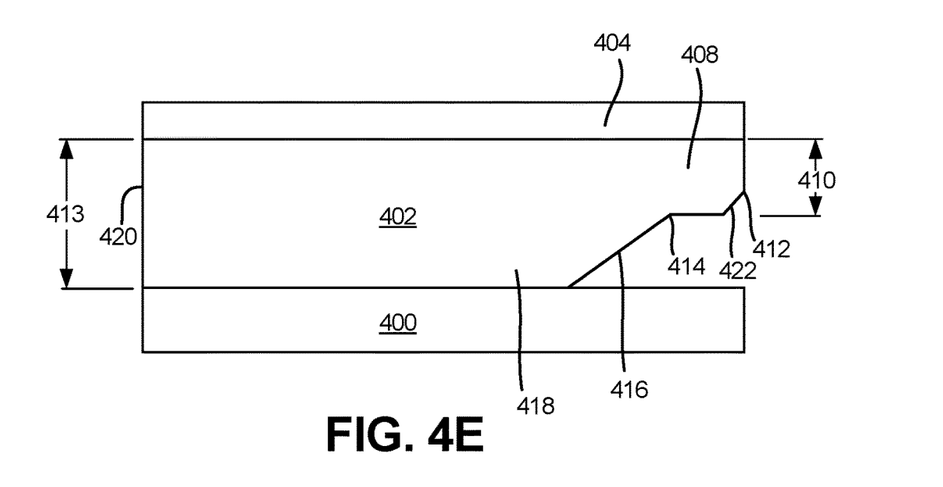

FIG. 4E illustrates a sectional view along line A-A of FIG. 4C. As can be seen in FIG. 4E, the magnetic pole material 402 may be removed such that a first pole section 408 extends form a first end 412 (at the plane of the bearing surface) of the write pole structure 402 to a break point 414. The first pole section 408 includes a leading edge bevel 422 and has a first height 410 between an end of the leading edge bevel 422 and the break point 414. Further, the removal of the magnetic pole material 402 may be such that a rear beveled portion 416 with a generally increasing height from the break point 414 to a second pole section 418 is formed. The second pole section 418 may extend to a second end 420 (at a desired distance behind the bearing surface plane) of the write pole structure 402. The second pole section has a second height 413. The leading edge bevel 422 may be formed by any suitable material removal process.

Figure 4F:
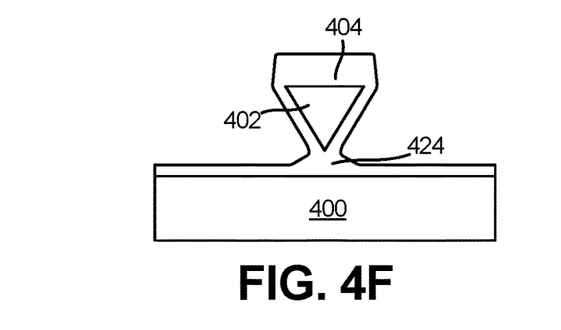

With reference now to FIG. 4F, a non-magnetic side gap material 424 is deposited. The side gap material 424 may be alumina and is preferably deposited by a conformal process such as atomic layer deposition (ALD) or some other conformal process. As can be seen in FIG. 4F, a portion of the side gap material 424 may also be deposited below section 408 of the write pole structure 402. In alternate embodiments, materials other than alumina may be used as the side shield gap material 424.

It should be noted that the particular method of making the initial pole (described above in connection with FIGS. 4A-4F) is not central to the structure or methods described herein. Alternatively, the initial write pole 402 could be formed by electroplating and may be formed with or without non-magnetic lamination layers.

Figure 4G:
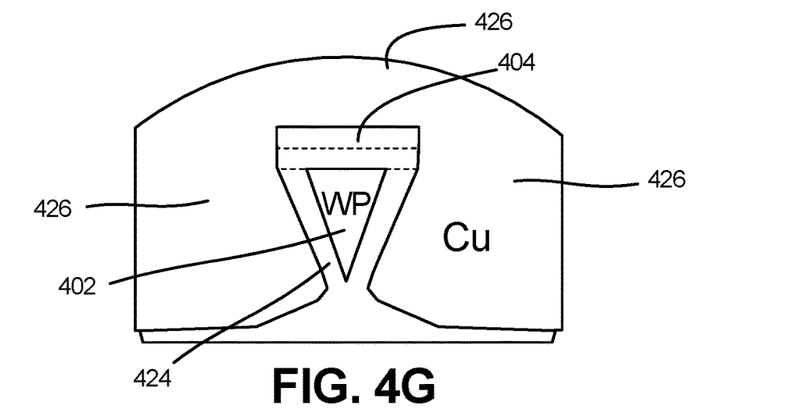
Figure 4H:
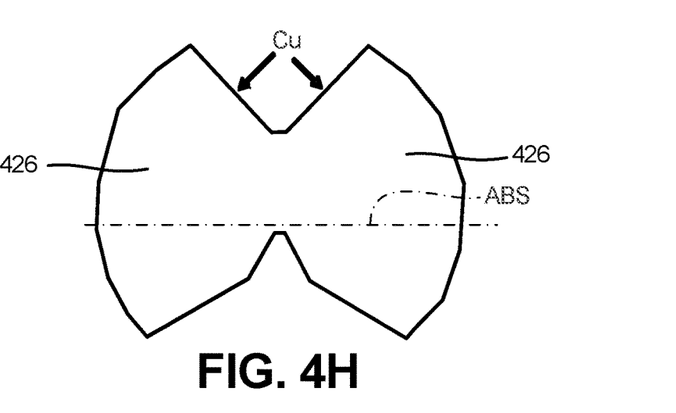
Figure 4I:
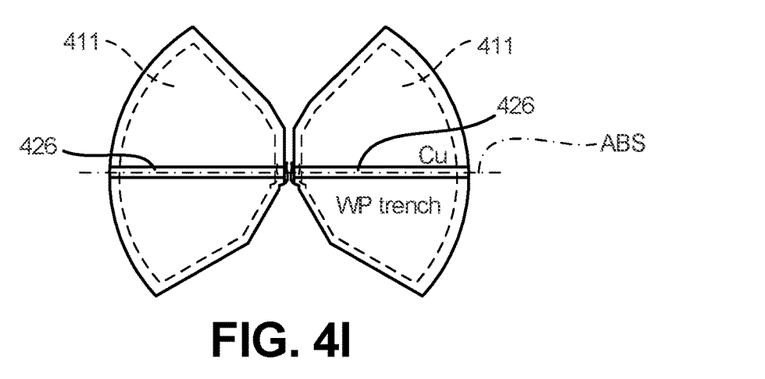

With reference to FIG. 4G, which is a schematic ABS view, a sacrificial material 426 is deposited or plated in at least a portion of trenches 411. The sacrificial material 426 may be a material that can be readily removed without damaging the write pole material 402. For example, in some embodiments, the sacrificial material 426 may be copper (Cu), which may be removed by one or more etching process described further below. In certain embodiments, a non-magnetic material other than Cu may be employed as the sacrificial material 426. In one embodiment, which is shown in FIG. 4H, trenches 411 are substantially entirely filled with sacrificial material 426. For example, in such an embodiment, sacrificial Cu material may be plated to entirely fill trenches 411. In another embodiment, which is shown in FIG. 4I, sacrificial material (for example, Cu) is patterned filled with predefined side shield dimensions and the remaining portions of the trenches 411 may be filled with alumina. Any suitable method may be utilized to carry out the pattern filling of Cu or other sacrificial material 426 in the embodiment of FIG. 4I.

Figure 4J:
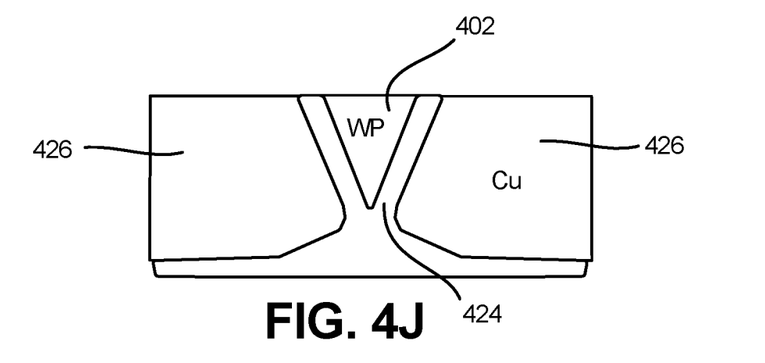

After the sacrificial material 426 is deposited or plated in the trenches, one or more material removal processes including a planarization operation may be carried out to produce the structure shown in FIG. 4J, which does not include the mask 404. The planarization process may include chemical mechanical planarization.

Figure 4K:
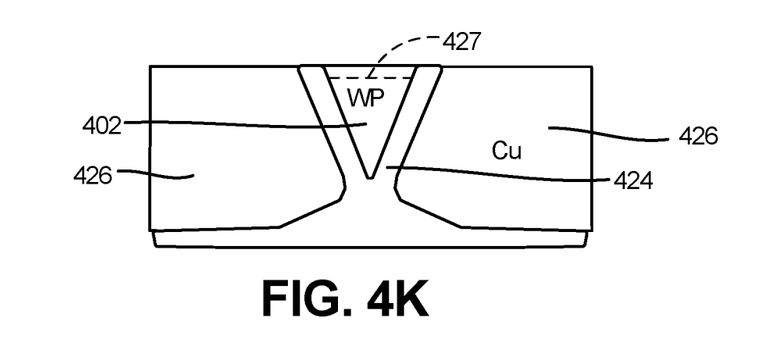

A portion of the write pole 402 at the top surface is then removed to form a beveled trailing edge surface 427 of the write pole 402, which is shown in FIG. 4K. In some embodiments, the formation of the beveled trailing edge surface 427 is carried out when the trenches are filled with the sacrificial material 426. In certain embodiments, the beveled trailing edge surface 427 is formed by photo patterning and a dry etch process. The dry etch process may be a static dry etch process, a rotational dry etch process or a combined static and rotational dry etch process.

Figure 4L:
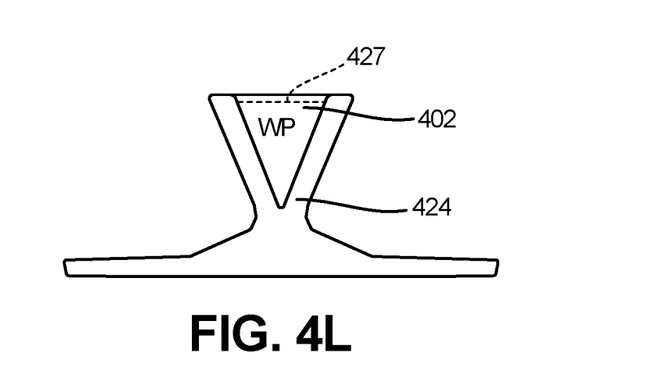

With reference to FIG. 4L, the sacrificial material 426 is removed after the beveled trailing edge surface 427 is formed. If the sacrificial material is Cu, one method that can be employed to remove the Cu sacrificial material layer 426 is emersion in a basic completing etch bath that will not readily etch the magnetic pole material 402. The Cu sacrificial material 426 could also be removed by electroetching in certain embodiments.

Figure 4M:
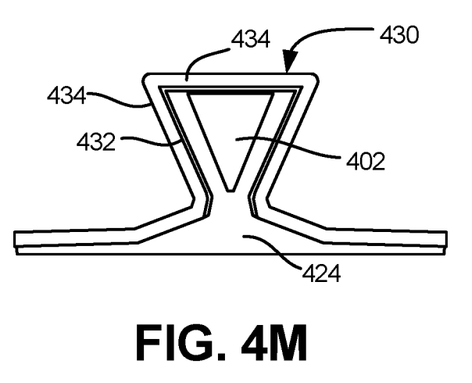

With reference to FIG. 4M, a front shield gap (FSG) 430 is subsequently formed by sputter deposition of, for example, Ru followed by ALD of, for example, alumina. This causes the FSG 430 to be wrapped around the write pole 402, thereby also adding material to the side shield gaps 424 and not forming any overhangs such as 30 shown in FIG. 1. In FIG. 4M, the Ru layer is denoted by reference numeral 432 and the alumina layer over the Ru layer 232 by reference numeral 434. In an alternate embodiment, FSG 430 is formed of a single alumina layer 434 and Ru layer 232 is excluded.

Figure 4N:
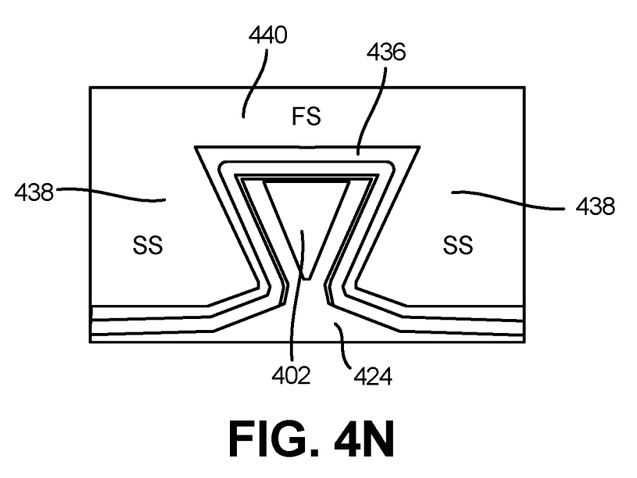

With reference to FIG. 4N, a front shield seed 436 is deposited over a top portion of the FSG 430 and over the side shield gaps 424. In some embodiments, the front shield seed 436 may include FeCo. In a specific embodiment, the front seed shield seed 436 may have a magnetic moment value of about 2.4 Tesla (T). Side shields 438 and front shield 440 may then be plated onto the seed layer 436. In some embodiments, the side shields 438 and the front shield 440 may be formed of NiFe. In a particular embodiment, a magnetic moment value of the side shields 438 and the front shield 440 is about 1.6 T. In other embodiments, any suitable material other than NiFe may be used to form side shields 438 and front shield 440. In some embodiments, side shields 438 and front shield 440 may be formed of different materials.

Figure 4O:
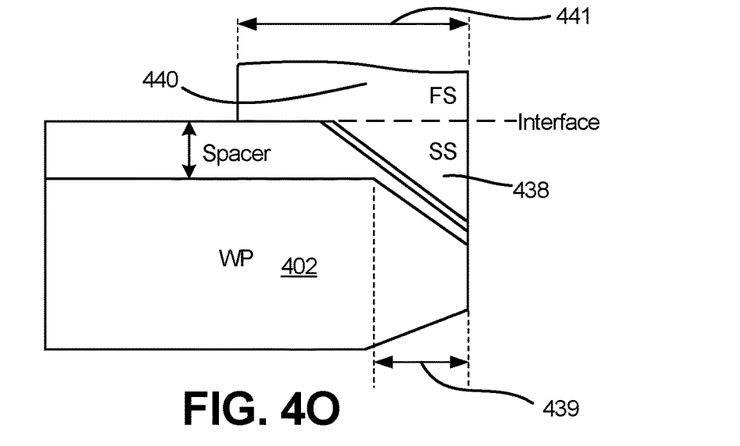
Figure 4P:
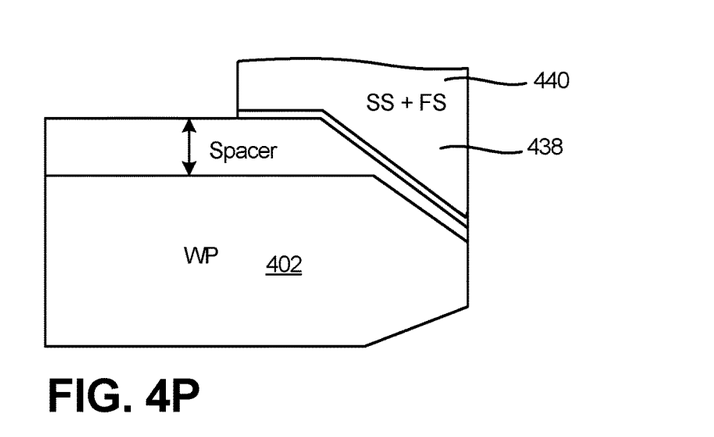

In embodiments in which dimensions of side shields 438 are pre-defined by the sacrificial material 426 (for example, the embodiment of FIG. 4I), side shields 438 and front shield 440 may be formed by one plating process in which a throat height of the front shield 440 is defined by photo patterning and is set to be larger than a throat height of the side shields 438. In embodiments in which the sacrificial materials 426 completely fills the trenches 411 (for example, the embodiment of FIG. 4H), side shields 438 and front shield 440 may be formed either by one plating process in which both elements 438 and 440 share a same throat height or by separate processes in which the throat height of the side shields 438 may be different from the throat height of the front shield 440. When separate processes are utilized to form the side shields 438 and the front shields 440, formation of side shields 438 may involve filling portions of the trenches with side shield material and backfilling the remaining portions of the trenches with an insulating material such as alumina. In such an embodiment, after backfilling with alumina, a chemical mechanical planarization process may be carried out, and that process may be followed by formation of the front shield 440. FIGS. 4O and 4OO illustrate schematic cross-sectional and front views, respectively, showing separately formed (i.e., formed in two different plating processes) side shields 438 and front shield 440. Dashed line 442 indicates separate formation of the side shields 438 and the front shield 440. In FIG. 4O, a throat height of the side shield(s) 438 is denoted by reference numeral 439 and a throat height of the front shield 440 is denoted by reference numeral 441. In the embodiment of FIG. O, side shield throat height 439 is different for the front shield throat height 441. However, in alternate embodiments, throat heights 439 and 441 may be substantially equal. FIG. 4P illustrates a cross-sectional view showing side shields 438 and front shield 440 formed in a single step.

Figure 5A:
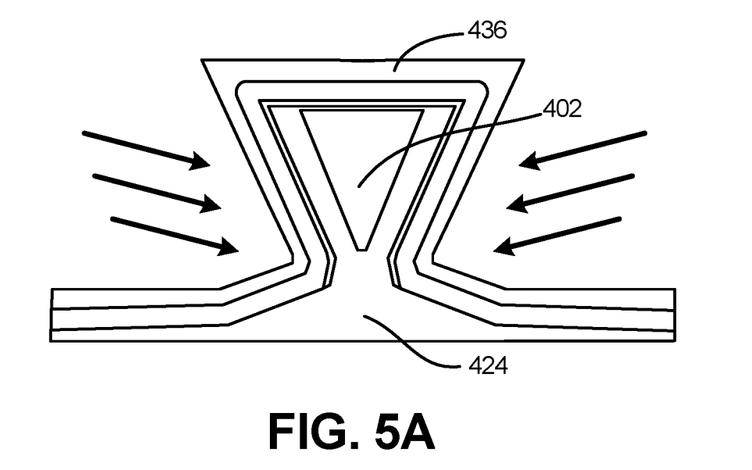
Figure 5B:
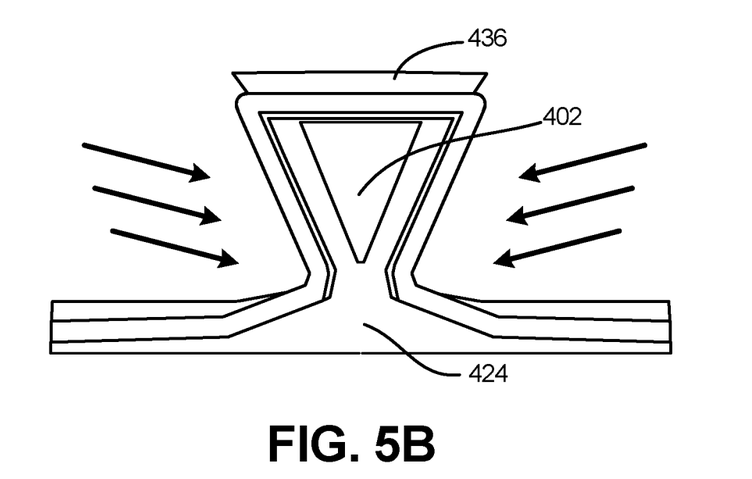

The process described above in connection with FIG. 4A-4P maintains front shield seed portions 436, which may be formed of FeCo, on sides of the write pole 402. In some embodiments, this may elevate ATI-related erasure due to the high magnetic moment of FeCo. Thus, in certain embodiments, front shield seed portions 436 on sides of the write pole 402 may be removed prior to formation of the side shields 438 and the front shield 440. To remove these portions of the front shield seed material 436, a static dry etch process may be utilized with a suitably selected dry etch angle. Such a process is shown in FIGS. 5A and 5B. The dry etch process may include Ar ion milling and reactive ion milling using chemistry that removes alumina or $SiO_2$.

Although FIGS. 4A-4P, 5A and 5B illustrate process steps for fabricating the write heads described in the present application, the application is not limited to the particular process steps or order described.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   depositing a layer of pole material on a substrate, the layer of pole material having a bottom surface adjacent to the substrate and a top surface opposite the bottom surface;
   depositing a masking material over a portion of the top surface;
   removing material from the pole material unprotected by the masking material to form a write pole having first and second side walls between the portion of the top surface protected by the masking material and the substrate;
   filling at least a portion of at least one trench formed by removal of the material from the layer of pole material with a sacrificial material;
   removing the mask and removing a portion of the write pole at the top surface to form a beveled trailing edge surface of the write pole;
   removing the sacrificial material after forming the beveled trailing edge surface; and
   depositing front shield gap material over the beveled trailing edge surface and along portions of the side walls.

2. The method of claim 1 and wherein the sacrificial material comprises a copper layer.

3. The method of claim 2 and wherein the removing the sacrificial material after forming the beveled trailing edge surface comprises carrying out a wet etch process to remove the copper layer.

4. The method of claim 1 and wherein the filling at least the portion of the at least one trench with the sacrificial material comprises substantially entirely filling the at least one trench with the sacrificial material.

5. The method of claim 1 and wherein the filling at least the portion of the at least one trench with the sacrificial material comprises only partially filling the at least one trench with the sacrificial material to form a sacrificial structure that occupies a first portion of the trench.

6. The method of claim 5 and further comprising filling a second portion of the trench unoccupied by the sacrificial structure with an insulating material.

7. The method of claim 6 and further comprising depositing or plating at least one side shield after removing the sacrificial structure and in place of the removed sacrificial structure, wherein a thickness of the deposited or plated at least one side shield corresponds to a thickness of the sacrificial structure.

8. The method of claim 1 and further comprising depositing a front shield seed material on the front shield gap material deposited over the beveled trailing edge surface and along the portions of the side walls.

9. The method of claim 8 and further comprising removing portions of the front shield seed material deposited on portions of the front shield gap material deposited along the portions of the side walls.

10. The method of claim 1 and further comprising depositing shield material to form a front shield over the front shield gap and side shields below the front shields.

11. The method of claim 10 and wherein the front shield and the side shields are formed in a single deposition step.

12. The method of claim 10 and wherein the front shield and the side shields are formed in separate deposition steps.

13. A write head formed by the method of claim 1.

14. A method comprising:
depositing a layer of pole material on a substrate, the layer of pole material having a bottom surface adjacent to the substrate and a top surface opposite the bottom surface;
depositing a masking material over a portion of the top surface;
removing material from the pole material unprotected by the masking material to form a write pole having first and second side walls between the portion of the top surface protected by the masking material and the substrate;
partially filling at least one trench formed by removal of the material from the layer of pole material with a sacrificial material to form a sacrificial structure that occupies a first portion of the trench, and filling a second portion of the trench with an insulating material;
removing the mask;
removing the sacrificial structure; and
depositing front shield gap material over the beveled trailing edge surface and along portions of the side walls.

15. The method of claim 14 and further comprising depositing at least one side shield after removing the sacrificial structure and in place of the removed sacrificial structure, wherein a thickness of the deposited at least one side shield corresponds to a thickness of the sacrificial structure.

16. The method of claim 14 and further comprising removing a portion of the write pole at the top surface to form a beveled trailing edge surface of the write pole after removing the mask and before removing the sacrificial structure.

17. A method comprising:
depositing a layer of pole material on a substrate, the layer of pole material having a bottom surface adjacent to the substrate and a top surface opposite the bottom surface;
depositing a masking material over a portion of the top surface;
removing material from the pole material unprotected by the masking material to form a write pole having first and second side walls between the portion of the top surface protected by the masking material and the substrate;
filling at least a portion of at least one trench formed by removal of the material from the layer of pole material with a sacrificial material;
removing the mask;
performing at least one shaping operation on the write pole;
removing the sacrificial material after performing the at least one shaping operation; and
depositing front shield gap material over the beveled trailing edge surface and along portions of the side walls.

18. The method of claim 17 and wherein performing the at least one shaping operation on the write pole comprises removing a portion of the write pole at the top surface to form a beveled trailing edge surface of the write pole.

19. The method of claim 17 and further comprising depositing shield material to form a front shield over the front shield gap and side shields below the front shields without any separation between the front shield and the side shields by the front shield gap.

20. The method of claim 17 and wherein the filling at least the portion of the at least one trench with the sacrificial material comprises only partially filling the at least one trench with the sacrificial material to form a sacrificial structure that occupies a first portion of the trench, and filling a second portion of the at least one trench with an insulating material.

* * * * *